United States Patent [19]
Oshima et al.

[11] Patent Number: 5,412,946
[45] Date of Patent: May 9, 1995

[54] NOX DECREASING APPARATUS FOR AN INTERNAL COMBUSTION ENGINE

[75] Inventors: Yujiro Oshima; Hideaki Muraki; Koji Yokota, all of Nagoya; Kiyoshi Nakanishi, Susono, all of Japan

[73] Assignees: Toyota Jidosha Kabushiki Kaisha; Kabushiki Kaisha Toyota Chuo Kenkyusho, Toyota, Japan

[21] Appl. No.: 961,230

[22] Filed: Oct. 15, 1992

[30] Foreign Application Priority Data

Oct. 16, 1991 [JP] Japan .................. 3-298252

[51] Int. Cl.$^6$ .................. F01N 3/36; F01N 3/20
[52] U.S. Cl. .................. 60/286; 60/276; 60/301; 60/303; 60/317
[58] Field of Search .................. 60/286, 287, 295, 301, 60/303, 317, 320, 276; 423/213.2, 213.5, 239.2, 248

[56] References Cited

U.S. PATENT DOCUMENTS

| | | | |
|---|---|---|---|
| 3,779,014 | 12/1973 | Nohira et al. | 60/309 |
| 3,826,810 | 7/1974 | Lawson | 60/301 |
| 3,842,600 | 10/1974 | Nakajima et al. | 60/286 |
| 3,986,350 | 10/1976 | Schmidt | 60/286 |
| 4,033,133 | 7/1977 | Houseman et al. | 60/300 |
| 4,050,903 | 9/1977 | Bailey et al. | 60/301 |
| 4,157,375 | 6/1979 | Brown et al. | 423/239 |
| 4,403,473 | 9/1983 | Gladden et al. | 60/286 |
| 4,585,632 | 4/1986 | Schneider et al. | 423/239 |
| 5,041,272 | 8/1991 | Tamura et al. | 423/239.2 |
| 5,164,350 | 11/1992 | Abe et al. | 502/66 |
| 5,272,871 | 12/1993 | Oshima et al. | 60/286 |

FOREIGN PATENT DOCUMENTS

| | | |
|---|---|---|
| 0147751 | 10/1985 | European Pat. Off. . |
| 0380143 | 1/1990 | European Pat. Off. . |
| 0445408 | 11/1991 | European Pat. Off. . |
| 63-38618 | 3/1988 | Japan . |
| 63-38619 | 3/1988 | Japan . |
| 63-38714 | 3/1988 | Japan . |
| 63-253110 | 10/1988 | Japan . |
| 1-139145 | 5/1989 | Japan . |

Primary Examiner—Ira S. Lazarus
Assistant Examiner—L. Heyman
Attorney, Agent, or Firm—Kenyon & Kenyon

[57] ABSTRACT

A lean NOx reduction catalyst capable of reducing NOx through reaction of $H_2$ with NOx at low temperatures below 350° C. is installed in a downstream portion of an exhaust pipe of an internal combustion engine in or near a muffler. Such an NOx reduction catalyst comprises, for example, Pt/zeolite catalyst. An $H_2$ generator is installed so as to supply the $H_2$ to an inlet side of the NOx reduction catalyst. The $H_2$ generator may include a reforming catalyst for reforming methanol, LPG, or natural gas to generate $H_2$. The generated $H_2$ flows to the NOx reduction catalyst where it reacts with NOx to purify the exhaust gas.

27 Claims, 9 Drawing Sheets

A: HC, CO REMOVED
B: HC, CO EXIST
CATALYST: MONOLITH, PT/ALUMINA

NOX DECREASING APPARATUS FOR AN INTERNAL COMBUSTION ENGINE

BACKGROUND OF THE INVENTION

1. Field of the Invention

The present invention relates to a nitrogen oxides (NOx) decreasing apparatus for an internal combustion engine. More specifically, the present invention relates to an exhaust gas purification system with a lean NOx catalyst capable of reducing NOx included in exhaust gas from an internal combustion engine, such as a so-called lean burn gasoline engine, a diesel engine, or a hydrogen engine, independently of a concentration of oxygen ($O_2$) included in exhaust gas, that is, independently of an operating air-fuel ratio.

2. Description of the Prior Art

As a method for decreasing NOx included in exhaust gas from an internal combustion engine, the following three methods are known:

(1) to decrease NOx by using a three-way catalyst,
(2) to decrease NOx by using combustion at excessively lean air-fuel ratios, and
(3) to decrease NOx by using a lean NOx catalyst (as disclosed in Japanese Patent Publication HEI 1-139145). However, there are the following problems with these methods.

With method (1), the ratio of air to fuel supplied to an engine must be controlled to about 14.5, namely, the stoichiometric air-fuel ratio. If the air-fuel ratio is leaner than the stoichiometric air-fuel ratio, NOx cannot be decreased by the three-way catalyst. Contrarily, it is well known that to obtain good fuel economy, an engine should be operated at air-fuel ratios leaner than the stoichiometric air-fuel ratio, as shown in FIG. 2. Thus, NOx decrease and fuel economy are incompatible in method (1).

Method (2) seeks to combine NOx decrease with fuel economy by using a so-called lean burn engine. However, when the engine is operated at air-fuel ratios lean enough to decrease NOx, the combustion approaches a misfire limit, and driveability gets worse. To prevent this, an improvement has been proposed, wherein turbulences are generated within an engine cylinder so that the burning velocity is increased to thereby shift the misfire limit to the lean side. However, if the turbulences are excessive and the flow velocity becomes too high, formation of a flame core and propagation of the flame in an early period of combustion will be obstructed. Thus, there is a limit to this method. Also, another improvement has been proposed, wherein the air-fuel ratio distribution within an engine cylinder is controlled so that rich air-fuel mixtures are formed only in a region close to the ignition plug to produce easy ignition. However, as illustrated in FIG. 3, when the misfire limit is shifted to the lean side, the negative slope of the NOx concentration curve also is decreased. Thus, not much effect on NOx concentration can be expected.

Method (3) is intended to solve the above-described problems of item (2), more particularly, to operate an engine at air-fuel ratios slightly closer to the stoichiometric air-fuel ratio than the misfire limit and then to purify the insufficiently decreased NOx by using a zeolite-type lean NOx catalyst. This method has the potential to provide a clean system that also has good fuel economy. However, since the lean NOx catalyst can operate only under oxidizing exhaust gas conditions and is usually exposed to high temperatures, it is difficult to obtain both a sufficiently high NOx conversion by the lean NOx catalyst and durability of the catalyst.

As will be understood from the above, problems of practical use exist with any conventional NOx decreasing method.

Lean burn gasoline engines as well as diesel engines include excess $O_2$ in the exhaust gas, that is, they are operated under oxidizing gas conditions. The leaner the air-fuel ratio, the greater is the concentration of $O_2$ included in the exhaust gas. A catalyst which reduces NOx under oxidizing gas conditions is defined as a lean NOx catalyst, which is usually composed of a noble metal-type catalyst or a zeolite-type catalyst. The lean NOx catalyst has an NOx conversion versus temperature characteristic as shown in FIG. 4. At temperatures above 350° C., mainly reduction of NOx by HC occurs, while at low temperatures below 250°-350° C., reduction of NOx by hydrogen ($H_2$) occurs, wherein NOx purification by $H_2$ is possible.

However, since the lean NOx catalyst is usually installed in or near an engine exhaust manifold in a conventional exhaust system, the temperature to which the catalyst is exposed is as high as 800°-900° C. Further, since the lean burn engine is operated at above stoichiometric air-fuel ratios, almost no $H_2$ remains in the exhaust gas. Therefore, the NOx reduction characteristic of a lean NOx catalyst at low temperatures below 250°-350° C. has not been used in a conventional lean burn gasoline engine or diesel engine.

SUMMARY OF THE INVENTION

An object of the invention is to provide an NOx decreasing apparatus for an internal combustion engine (a lean burn gasoline engine, a diesel engine, or a hydrogen engine), which can effectively reduce NOx included in exhaust gas even under oxidizing gas conditions, independently of a concentration of $O_2$ included in the exhaust gas, without deteriorating a fuel economy characteristic of the engine.

To achieve the above-described object of the invention, in an NOx decrease apparatus for an internal combustion engine in accordance with the present invention, an NOx reduction catalyst for causing NOx and $H_2$ to react with each other to reduce NOx is installed in an exhaust conduit of the engine in or near a muffler. A reforming catalyst for reforming methanol or hydrocarbon fuel such as LPG and natural gas to generate $H_2$ is installed so that the generated $H_2$ is supplied to an inlet side of the lean NOx catalyst, whereby the lean NOx catalyst reduces NOx at low temperatures in or near the muffler.

In the apparatus of the invention, methanol or hydrocarbons are led to the the reforming catalyst, where the methanol or hydrocarbons are reformed to generate $H_2$. The generated $H_2$ is supplied into the exhaust conduit of the engine at the inlet side of the NOx reduction catalyst and is mixed with NOx-containing exhaust gas from the engine. The NOx reduction catalyst causes $H_2$ and NOx to react with each other at low temperatures to reduce NOx. Since NOx is reduced through reaction with $H_2$ independently of a concentration of $O_2$ included in exhaust gas, the air-fuel ratio can be freely determined from the viewpoint of good combustion and fuel economy without having to achieve minimum generation of NOx. As a result, a high fuel economy and good driveability can be maintained.

BRIEF DESCRIPTION OF THE DRAWINGS

The above-described object and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 1:
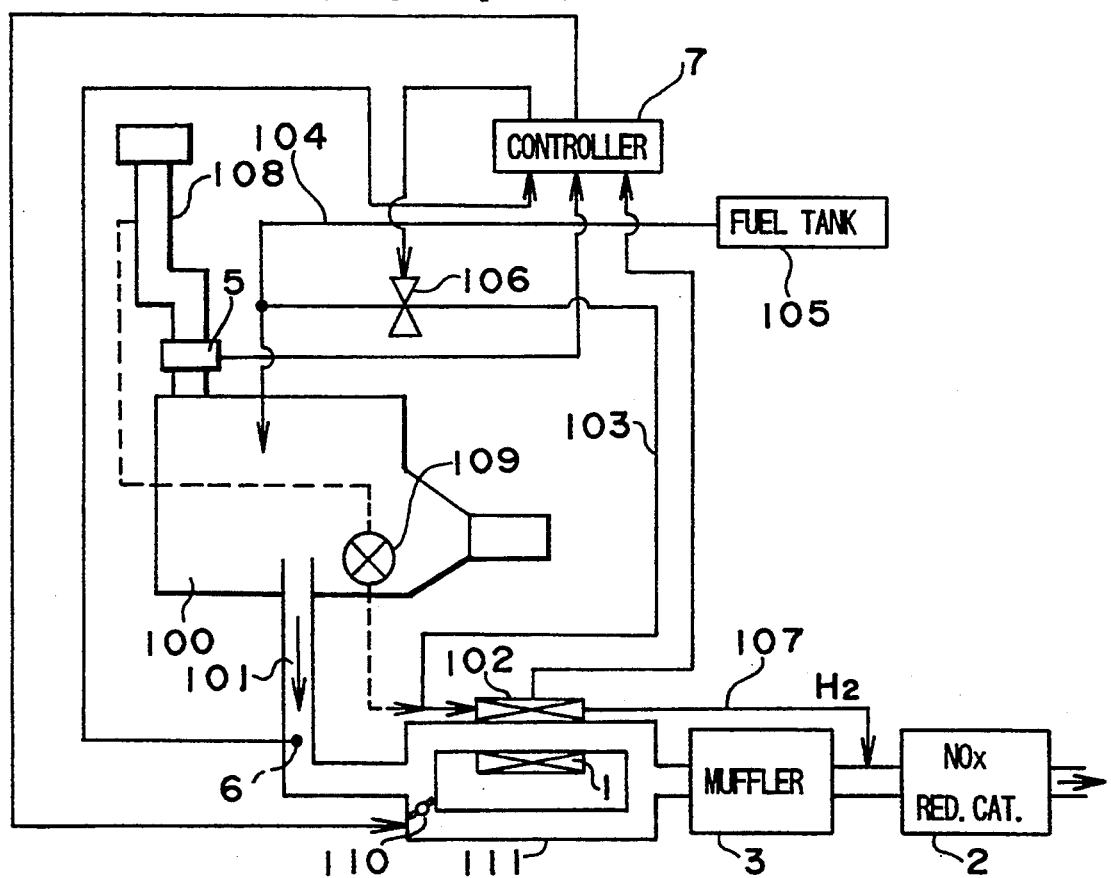
FIG. 1 is a schematic system diagram illustrating a basic arrangement of an NOx decreasing apparatus for an internal combustion engine in accordance with the present invention.
Figure 2:
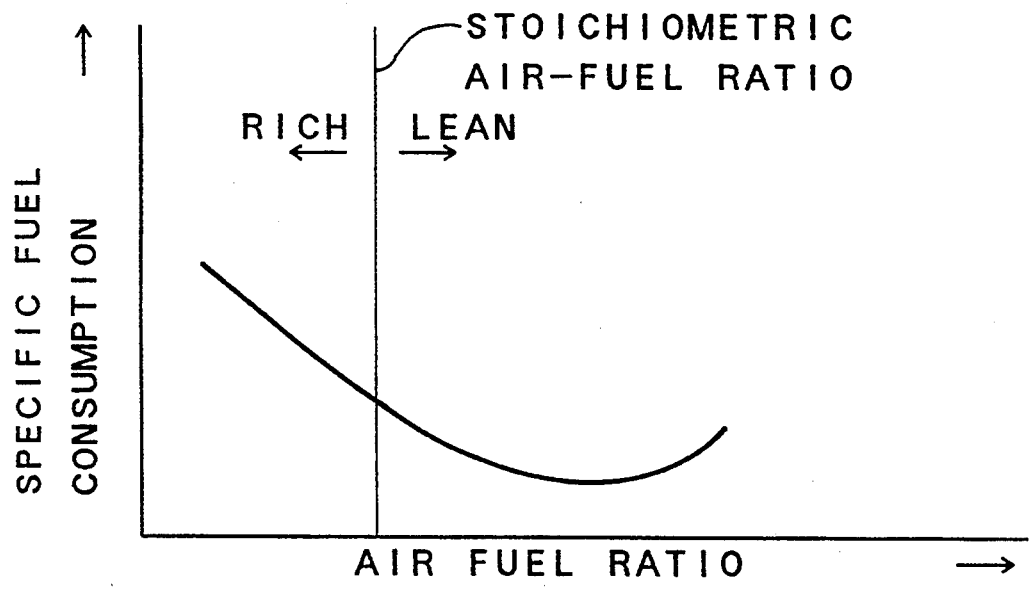
FIG. 2 is a graphical representation of a specific fuel consumption versus air-fuel ratio characteristic.
Figure 3:
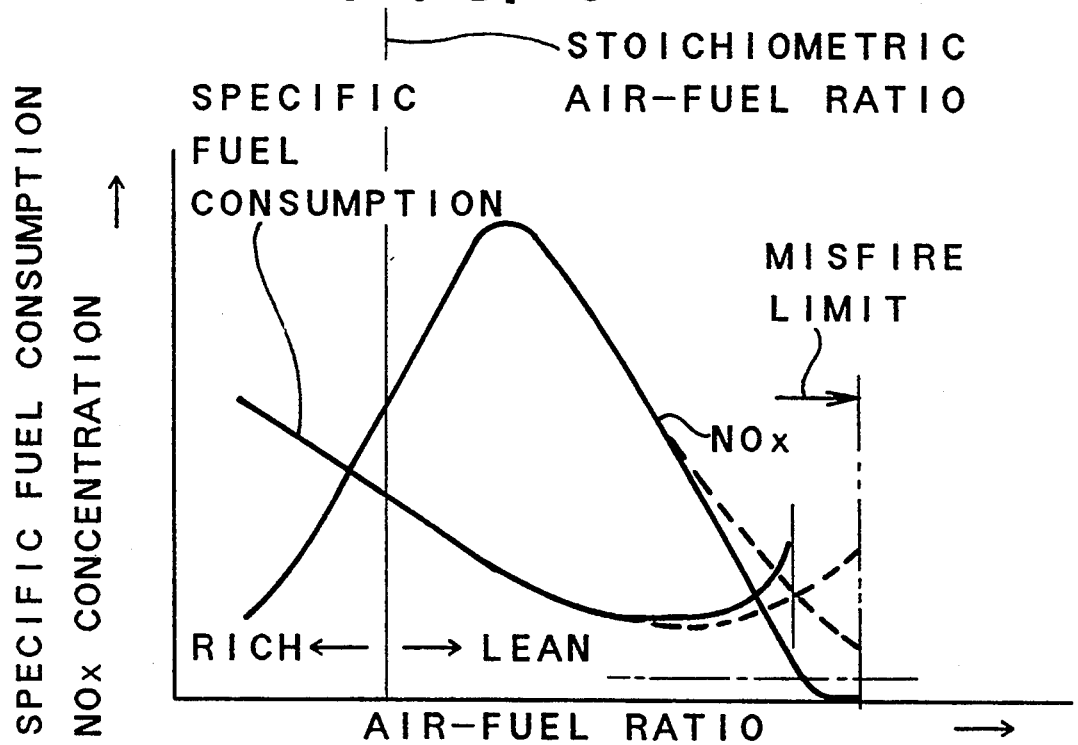
FIG. 3 is a graphical representation of an NOx and specific fuel consumption versus air-fuel ratio characteristic.
Figure 4:
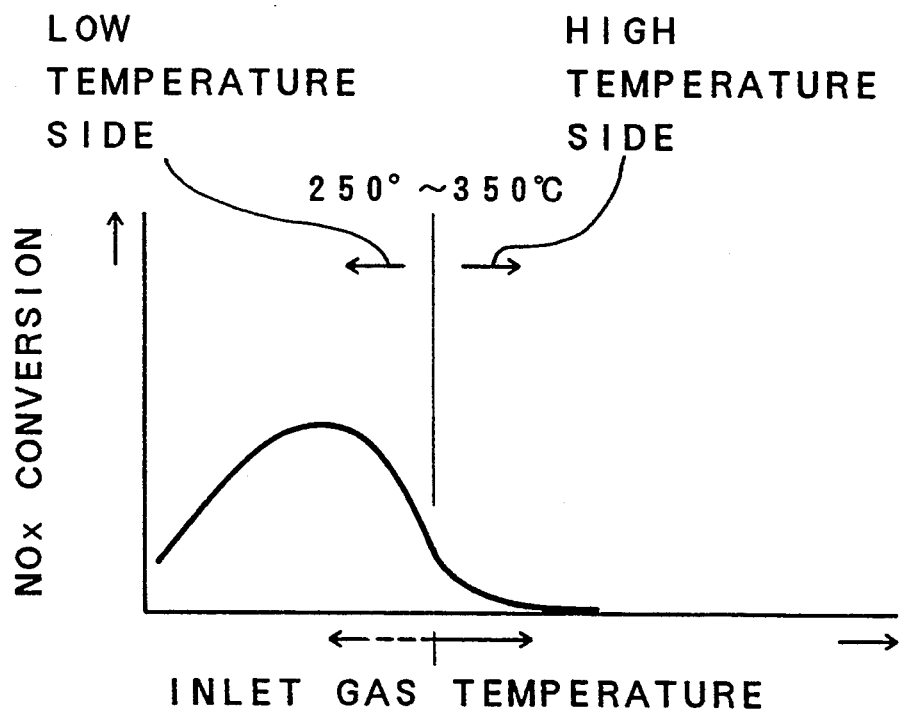
FIG. 4 is a graphical representation of an NOx conversion versus inlet gas temperature characteristic.

With reference to FIG. 1, in an NOx decreasing apparatus for an internal combustion engine in accordance with the present invention, an $H_2$ generator 102 for generating $H_2$ and supplying the generated $H_2$ to an exhaust conduit 101 of an engine 100 includes a reforming catalytic converter 102 containing a reforming catalyst 1. The type of reforming catalyst 1 is selected according to the kind of fuel used in the engine.

More particularly, in an engine using methanol as fuel, the following three types of reforming catalysts can be used:

(1) At least one metal selected from the group consisting of noble metals such as palladium (Pd) and platinum (Pt), and transition metals such as copper (Cu), chrome (Cr), and nickel (Ni), is used as catalyst metal of the reforming catalyst. Methanol is evaporated by heat of the exhaust gas and is reformed at the reforming catalyst to generate $H_2$ The temperature of an inlet portion of the reforming catalyst is maintained at about 300° C. The reaction at the reforming catalyst is as follows:

$$CH_3OH \rightarrow CO + 2\ H_2$$

(2) A Cu-Ni-Cr/alumina catalyst (Cu-Ni-Cr is deposited onto a carrier of alumina) is used as the reforming catalyst. Methanol fuel is evaporated and is mixed with air. The mixture is led to the reforming catalyst where the methanol is partially-oxidized to generate $H_2$. The catalyst temperature is maintained at 400°–500° C. by controlling the amount of air supplied to the methanol. The reaction at the reforming catalyst is as follows:

$$CH_3OH + Air \rightarrow H_2 + CO + H_2O$$

(3) Cu-Mn or Cu-Zn is used as the reforming catalyst. Water vapor, air, or mixture of methanol and water is added to methanol fuel to reform the fuel to generate $H_2$. The catalyst temperature is controlled to about 250° C. The reaction at the reforming catalyst is as follows:

$$CH_3OH + H_2O \rightarrow 3\ H_2 + CO_2$$

Further, in an engine using hydrocarbons (HC) such as LPG (liquefied petroleum gas) and natural gas as fuel, at least one kind of metal selected from the group consisting of Ni, Co (cobalt), and Rh (rhodium) is used as the reforming catalyst. The fuel is reformed at 300°–800° C. Water vapor, air, or water from a water tank is added to the HC fuel to reform the HC fuel and to generate $H_2$. The catalyst is maintained at a respective temperature according to the kind of catalyst used. Usually, methane is generated at low temperatures and CO (carbon monoxide) is generated at high temperatures. The reactions at the reforming catalyst are as follows:

$HC + H_2O \rightarrow H_2 + CH_4 + CO_2$  300°–500° C.

$HC + H_2O \rightarrow H_2 + CO + CO_2$  800° C.

$HC + Air \rightarrow H_2 + CO$  800° C.

$HC + EGR\ gas \rightarrow H_2 + CO$  700° C.

In the NOx decreasing apparatus for an internal combustion engine in accordance with the invention, an NOx sensor 6 is installed in the exhaust conduit 101 connected to the internal combustion engine 100 to detect an NOx concentration of the exhaust gas, and an intake air sensor 5 is installed in an intake conduit 108 to detect a total amount of gas. In a controller 7 (electronic control unit), an amount of NOx is calculated from the output of the NOx sensor 6 and the output of the intake air flow sensor 5, and the amount of $H_2$ to be supplied to purify the calculated amount of NOx is determined. The amount of exhaust gas supplied to the reforming catalytic converter or the amounts of air and fuel supplied to the reforming catalytic converter to partially oxidize the fuel may be controlled in accordance with the determined amount of required $H_2$.

Alternatively, the amount of NOx in the exhaust gas may be predicted frin the outputs of the usual sensors for detecting the engine operating conditions such as an engine speed sensor, an intake pressure detecting sensor, and a throttle valve opening degree detecting sensor or a fuel injection detecting sensor of a fuel pump. The amount of fuel supplied to the reforming catalytic converter may be controlled corresponding to the predicted NOx amount.

Furthermore, in the NOx decreasing apparatus of the invention, a mixer may be installed to evenly mix the supplied $H_2$ with exhaust gas, and a muffler may be constructed integrally with the NOx reduction catalyst to make a compact assembly of the muffler and the NOx reduction catalytic converter.

In more detail, a basic system of the NOx decreasing apparatus for an internal combustion engine in accordance with the present invention is illustrated in FIG. 1. A first feature of the invention is that NOx reduction by $H_2$ is performed at all air-fuel ratios at low temperatures. A second feature of the invention is that a reforming device to reform fuel to generate $H_2$ is included in the system. A third feature of the invention is that the $H_2$ generation is controlled according to the amount of NOx included in the exhaust gas, that is, according to the engine operating conditions, so that the $H_2$ is supplied to a NOx reduction catalyst in the proper molar amount.

As illustrated in FIG. 1, the NOx reduction catalyst 2 is disposed at a downstream part of the exhaust conduit 101 in or near a muffler 3. If the NOx reduction catalyst were disposed upstream at a high temperature position, $H_2$ would react with $O_2$ and the selective reaction of $H_2$ with NOx would not occur.

A conduit 103 branches from a fuel conduit 104 connected to a fuel tank 105 and connects via a flow control valve 106 to the reforming catalytic converter 102 containing the reforming catalyst 1. An $H_2$ conduit 107 connects the reforming catalytic converter to the exhaust conduit upstream of the NOx reduction catalyst 2 so that the generated $H_2$ is supplied to an inlet side of the NOx reduction catalyst 2. In order to supply $H_2$ in molar proportion to the amount of NOx, the intake air sensor 5 is installed in the intake conduit 108 of the engine 100 and the NOx sensor 6 is installed in the exhaust conduit 101 of the engine to detect the concentration of NOx included in the exhaust gas. The amount of NOx included in the exhaust gas is calculated by the controller 7 based on the outputs of the sensors 5 and 6, and the amount of $H_2$ required to purify that amount of NOx is calculated by the controller 7.

To cause the $H_2$ generator to generate $H_2$ by the amount calculated, the amount of fuel to be supplied to the reforming catalytic converter, the amount of exhaust gas to heat the reforming catalytic converter, and the amount of air to be supplied to the reforming catalytic converter in the case where fuel is partially oxidized are controlled. In this connection, the amount of exhaust gas to heat the reforming catalytic convertor is controlled by an exhaust bypass valve 110 installed in a bypass conduit 111. The air flow to the reforming catalytic converter is controlled by an air control valve 109.

Figure 5:
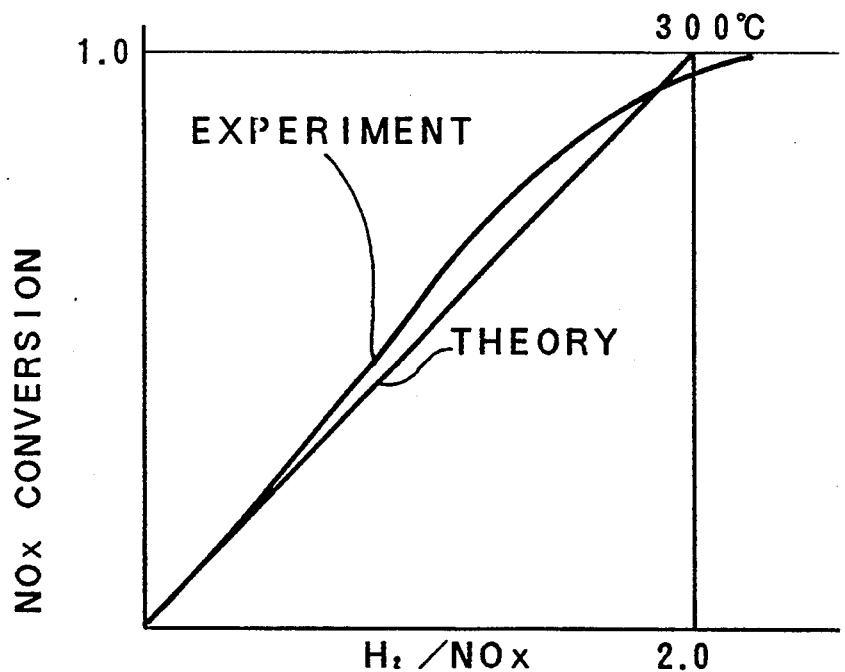
FIG. 5 is a graphical representation of an NOx conversion versus ratio of amount of supplied $H_2$ to amount of NOx characteristic.

FIG. 5 shows curves of NOx conversion versus ratio of $H_2$ to NOx. When $H_2$ is supplied at the ratio that $H_2$: NOx=2; 1, all NOx will be reduced as shown by the theoretical line in FIG. 5, if the NOx and the supplied $H_2$ react completely with each other. However, since NOx and $H_2$ will not react completely with each other, the actual conversion will be as shown by the experimental curve in FIG. 5. At $H_2$/NOx ratio less than 2.0, the experimental curve is positioned to the left of the theoretical line. This is because water vapor included in the exhaust gas is transformed into $H_2$ on the noble metal-type catalyst. Thus, more $H_2$ than the amount supplied from the feforming catalytic converter is available to react with the NOx.

In one embodiment of the invention, a mixer for mixing the supplied $H_2$ with exhaust gas may be installed on an inlet side of the NOx reduction catalyst. In another embodiment of the invention, the reforming catalytic converter is installed downstream of an oxidation catalyst disposed at an outlet of an exhaust manifold of the engine, and the NOx reduction catalyst is installed in or downstream of the muffler so that the catalysts are maintained at respective optimum temperatures.

In yet another embodiment of the invention, an HC oxidation device for oxidizing HC and CO, such as an oxidation catalyst, a three-way catalyst, and an exhaust reactor is installed in a portion of the exhaust conduit close to the exhaust manifold, and Pt-zeolite catalyst (where Pt is deposited on zeolite) is used as the lean NOx catalyst. Further, the NOx reduction catalytic converter and the exhaust muffler are integrally constructed into a single assembly in which the NOx reduction catalyst is provided with a muffler function.

Further, in a diesel engine, a soot trapper or an unburned HC oxidizing device may be provided upstream of the NOx reduction catalyst. Furthermore, the present invention may be applied not only to a lean burn gasoline engine and a diesel engine but also to a hydrogen engine where hydrogen gas is used as fuel. In the case of a hydrogen engine, an $H_2$ generator is not required and a portion of the $H_2$ fuel can be supplied to an inlet side of the NOx reduction catalyst.

These embodiments of the invention will be explained in more detail below.

Figure 6:
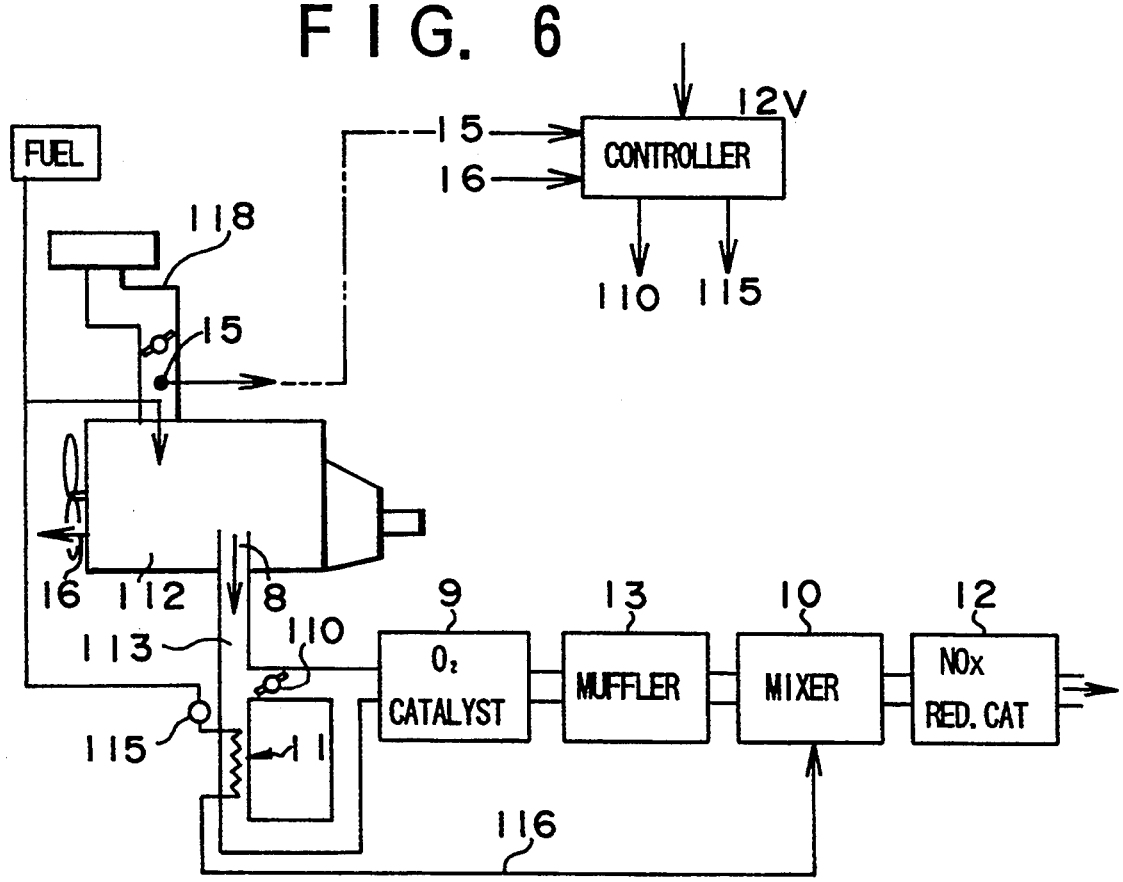
FIG. 6 is a schematic system diagram of an apparatus in accordance with a first embodiment of the invention.

FIG. 6 illustrates a first embodiment of the invention where the system of the invention is applied to a lean burn gasoline engine 112 with an engine displacement of 1 liter. The engine 112 of the first embodiment is operated at excess air ratios of 0.95–1.0 (slightly rich or just a stoichiometric air-fuel ratio) in an idling condition, at excess air ratios of 0.8–1.0 (rich) in a full load condition and a rapid acceleration condition, and at excess air ratios of 1.2–1.8 in the remaining engine operating conditions. An oxidation catalyst 9 is installed in an exhaust conduit 113 near an outlet of an exhaust manifold 8 to oxidize unburned products such as HC and CO. Further, an NOx reduction catalyst 12 is disposed in the exhaust conduit downstream of a muffler 13. A mixer 10 is provided on the inlet side of the reduction catalyst 12 to evenly mix $H_2$ with exhaust gas.

Figure 7:
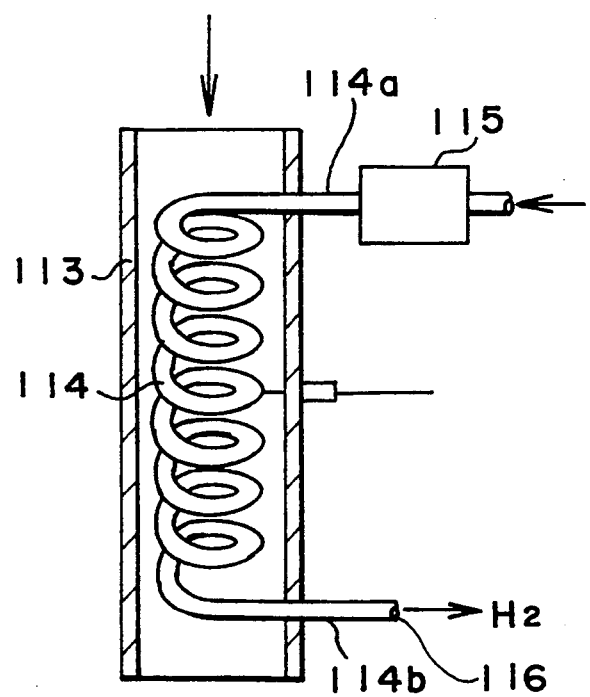
FIG. 7 is an enlarged cross-sectional view of an $H_2$ generator of the apparatus of FIG. 6.
Figure 8:
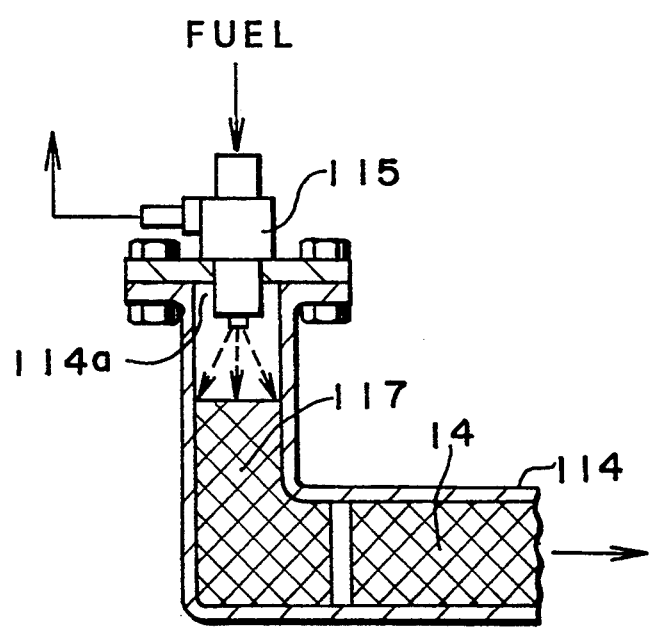
FIG. 8 is a still further enlarged cross-sectional view of an inlet end portion of the $H_2$ generator of FIG. 7.

An $H_2$ generator 11 (shown in enlarged detail in FIG. 7) includes an inner core in the form of a coiled tube 114 inserted in the exhaust conduit. At an inlet end 114a of the inner core, an electromagnetic fuel injection valve 115 is provided for injecting methanol fuel into the inner core. An outlet end 114b of the inner core leads to the mixer 10 through a conduit 116. As shown in FIG. 8, a porous ceramic member 117 for evaporating the methanol is located at the inlet of the inner core, and a reforming catalyst 14 in the form of pellets fills the inner core downstream of the methanol evaporating ceramic member. If the reforming catalyst is in monolithic form, the inner core is changed from a coil to a straight tube. Pd is used for the reforming catalyst.

In FIG. 6, an intake air sensor 15 is installed in the intake conduit 118 to detect the amount of air supplied to the engine 112, and an NOx sensor 16 is installed in the exhaust conduit of the engine to detect the NOx concentration of the exhaust gas. In the one-liter engine example of FIG. 6, since the moles of $H_2$ required are equal to the moles of NOx, 0.3 l/min of $H_2$ is necessary at a vehicle speed of 50 Km/h and 1.0 l/min of $H_2$ is necessary when the engine is operated at the maximum output. The $H_2$ is produced by reforming a portion of the fuel. The portion of fuel consumed to produce the required $H_2$ is equal to or less than 1-2% of the fuel required to drive a vehicle. As an amount of 15-20% of fuel is saved by using a lean burn engine, the amount of 1-2% is negligible compared with the amount of 15-20%. Thus, the fuel economy of the lean burn engine is not degraded by adding an $H_2$ generator. In this connection, the amount of methanol required to generate the $H_2$ is about 0.15 l/min at a vehicle speed of 50 Km/h.

In the first embodiment of the invention, since only a small amount of fuel is reformed by the $H_2$ generator 11 and NOx is reduced through reaction with the generated $H_2$ at the NOx reduction catalyst 12 at low temperatures, the amount of NOx can be decreased independently of the excess air ratio of the engine 112. CO, which may be produced together with $H_2$, can be transformed by the following reaction:

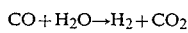

Further, CO can be separated from $H_2$ by a Pd membrane, and $H_2$ of high purity can be supplied into the inlet side of the NOx reduction catalyst 12. However, since the amount of produced CO is very small, CO acts as a reduction material in the NOx reduction catalyst 12. Thus, there is no fear that CO is exhausted to atmosphere.

Figure 9:
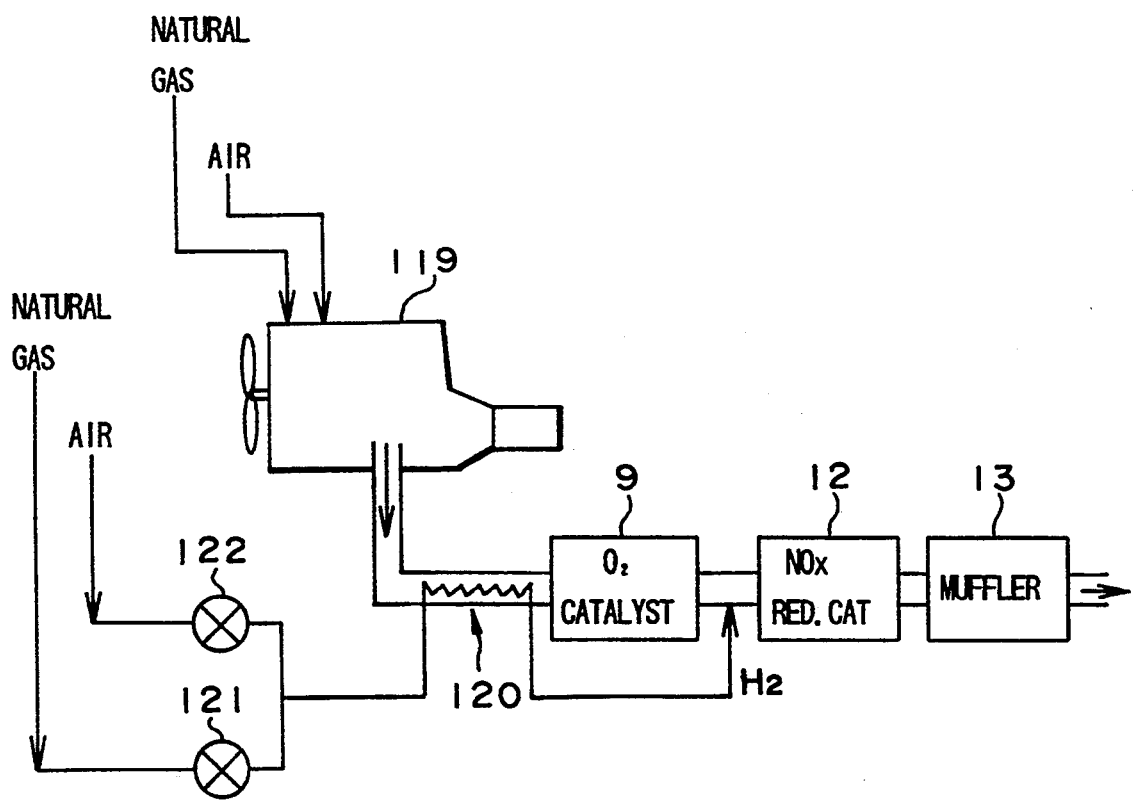
FIG. 9 is a schematic system diagram of an apparatus in accordance with a second embodiment of the invention.

FIG. 9 illustrates a second embodiment of the invention which comprises a natural gas engine 119 equipped with an $H_2$ generator 120 and used for an air conditioner or a power generator. Unlike a vehicle engine, such an engine is operated at a constant engine speed and a constant engine load. Therefore, it is easy to maintain constant temperatures of the reforming catalyst of the $H_2$ generator 120 and the NOx reduction catalyst 13. Since the structures of the apparatus of the second embodiment are substantially the same as those of the first embodiment, descriptions of them will be omitted.

The fuel supplied to the $H_2$ generator 120 is natural gas. The amount of natural gas and the amount of air are controlled by respective control valves 121 and 122, which are controlled in response to the same sensor outputs in substantially the same manner as in the first embodiment.

Figure 10:
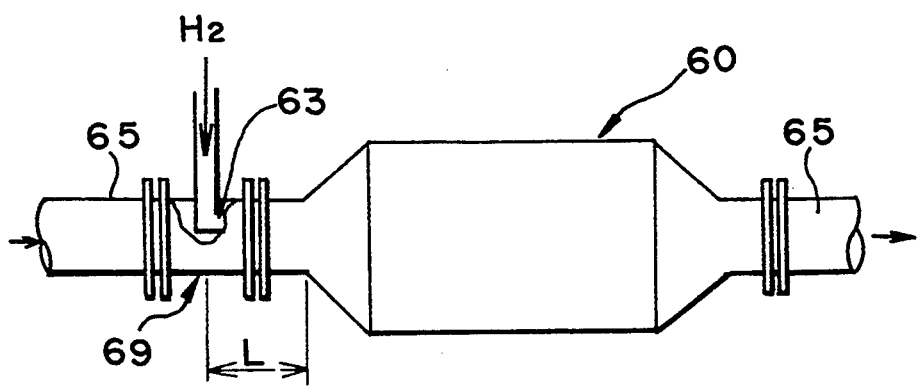
FIG. 10 is an enlarged side view of one embodiment of an $H_2$ mixer and NOx reduction catalytic converter according to the invention.

FIG. 10 illustrates an embodiment of an $H_2$ mixer and NOx reduction catalyst container according to the invention. NOx reduction characteristics are greatly affected by the $H_2$ supply conditions and structures. In FIG. 10, the engine exhaust gas including NOx and $O_2$ flows through an exhaust conduit 65 to an NOx reduction catalytic converter 60, and $H_2$ is supplied to an $H_2$ mixer 69 located on the inlet side of the NOx reduction catalytic converter 60.

Figure 11:
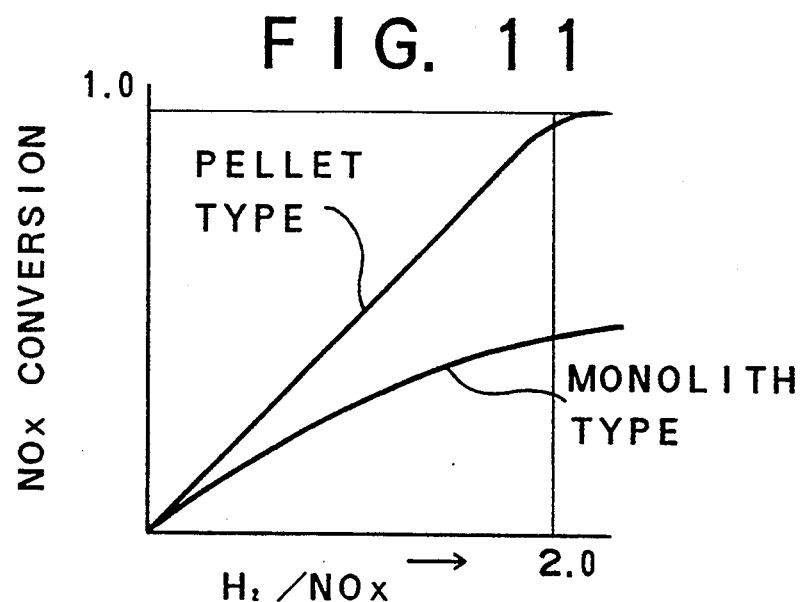
FIG. 11 is a graphical representation comparing NOx converting characteristics of a pellet-type catalyst and a monolithic catalyst used in the NOx reduction catalytic converter of FIG. 10.
Figure 12:
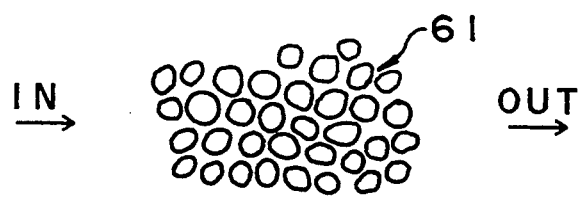
FIG. 12 is a partial cross-sectional view of a pellet-type catalyst for use in the NOx reduction catalytic converter of FIG. 10.
Figure 13:
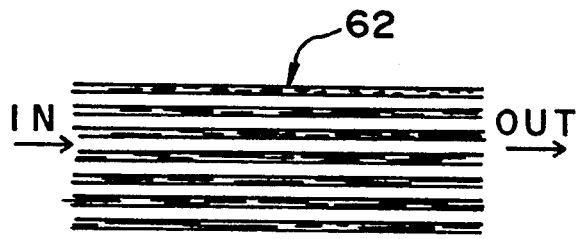
FIG. 13 is a partial cross-sectional view of a monolithic catalyst for use in the NOx reduction catalyst container of FIG. 10.

The NOx conversion characteristics for two types of catalyst structures are shown in FIG. 11, where the abscissa measures a ratio of the amount of supplied $H_2$ to the amount of NOx, and the ordinate measures an NOx conversion or NOx purification rate. In a case where a catalyst in the form of pellets 61, as shown in FIG. 12, fill the NOx reduction catalytic converter 60 of FIG. 10, the NOx reduction catalyst produces a high NOx conversion, as shown in FIG. 11. In a case where a monolithic catalyst 62, as shown in FIG. 13, fills the catalytic converter of FIG. 10, FIG. 11 shows that the NOx conversion of the NOx reduction catalyst decreases, even if the amount of supplied $H_2$ is the same.

This is because, in the case of the catalyst in the form of pellets, $H_2$ and NOx are well mixed with each other when they flow through the labyrinthine clearances between the pellets. In contrast, in the case of the monolithic catalyst, since the monolithic catalyst has numerous parallel passages which are independent of each other, an uneven distribution of $H_2$ at the inlet of the catalyst is maintained up to the outlet of the catalyst. Thus, the utilization rate of $H_2$ of the monolithic catalyst is inferior to that of the pellet-type catalyst.

From the operational viewpoint of an engine exhaust system, however, the pellets of catalyst are apt to cause abrasion due to vibration and to get smaller in size. They also tend to cause a large flow friction loss due to the labyrinth passages and thus to raise the engine back pressure and to degrade the power characteristic of the engine. Therefore, it is desirable to use a monolithic catalyst for the NOx reduction catalyst.

Figure 14:
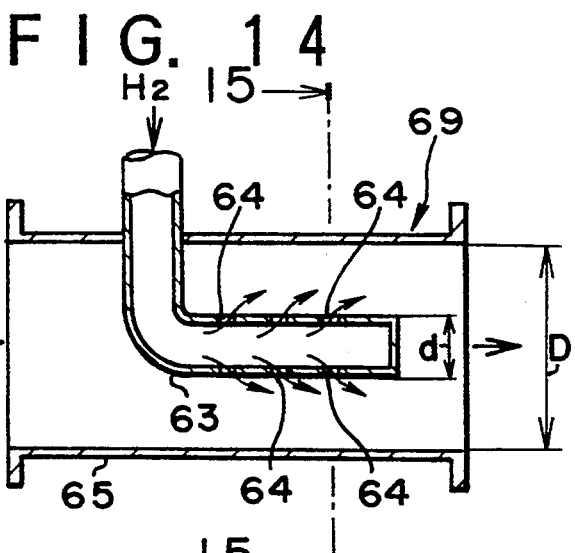
FIG. 14 is a further enlarged cross-sectional view of an $H_2$ mixer for use in the apparatus of FIG. 10.
Figure 15:
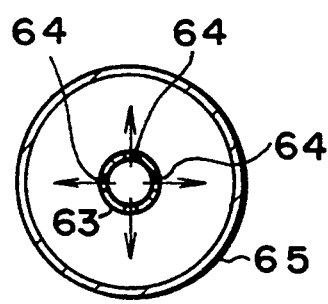
FIG. 15 is a cross-sectional view of the mixer taken along line 15—15 of FIG. 14.

If a monolithic catalyst is used in the NOx reduction catalytic converter, then a mixer 69 for evenly mixing $H_2$ with NOx is necessary. FIGS. 14 and 15 illustrate a mixer 69 comprising an $H_2$ injection nozzle 63. The $H_2$ injection nozzle 63 is a pipe bent in the form of a letter L and has a plurality of radially directed injection holes 64. The number of injection holes 64 is preferably four to six in each of at least one plane perpendicular to the axis of the pipe (six holes in each of two mutually perpendicular planes are provided in the embodiment of FIGS. 14 and 15).

Figure 16:
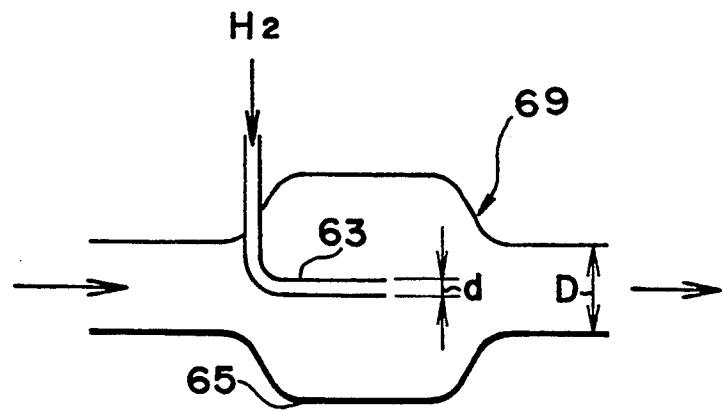
FIG. 16 is a schematic cross-section illustrating a dimensional relationship between a diameter d of an $H_2$ injection nozzle and a diameter D of an exhaust conduit in the apparatus of FIG. 14.

A ratio of an outside diameter d of the injection nozzle 63 to an inside diameter D of the exhaust conduit (exhaust pipe) 65 should be equal to or greater than 0.2 (20%). When the diameter d is increased relative to D, the flow resistance will be large, so that a portion of the exhaust pipe 65 may be enlarged in cross section, as shown in FIG. 16. A distance L (see FIG. 10) between the injection nozzle 63 and the NOx reduction catalyst 60 should be equal to or greater than twice the outside diameter D of a portion of the exhaust conduit not enlarged in cross section. Increasing L beyond ten times D, however, produces little additional effect in even mixing of $H_2$ with NOx.

Figure 17:
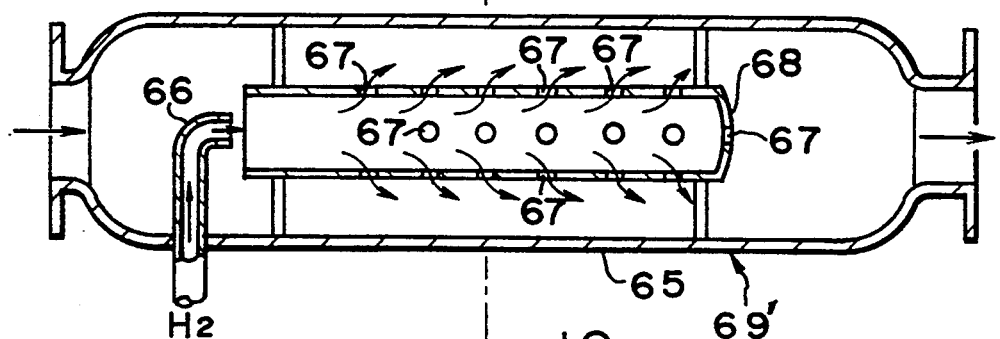
FIG. 17 is a cross-sectional view of another mixer for use in the apparatus of FIG. 10.
Figure 18:
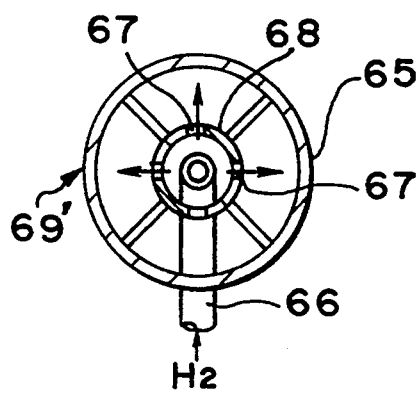
FIG. 18 is is a cross-sectional view of the mixer taken along line 18—18 of FIG. 17.

An alternative embodiment of the $H_2$ mixer 69' is shown in FIGS. 17 and 18. In this embodiment, the mixer includes an HC injection nozzle 66 of a small diameter and a cylinder 68 having a diameter greater than that of the HC injection nozzle. The cylinder 68 has an open upstream end and an end plate at the downstream. A plurality of apertures 67 are formed in the wall of the cylinder 68. The $H_2$ injected from the HC injection nozzle 66 mixes with a portion of the exhaust gas which enters the cylinder 68. The mixture of the $H_2$ and the exhaust gas flows through the apertures of the cylinder 68 and mixes with the remaining portion of the exhaust gas flowing outside the cylinder 68. Mixing $H_2$ with the exhaust gas in two steps produces a uniform mixture.

The mixing degree of $H_2$ with exhaust gas is affected by the relative diameters of the nozzle 66 and the cylinder 68. Preferably, a ratio of the inside diameter D of the cylinder 68 to the outside diameter d of the injection nozzle 66 is in the range of 1.7–3, and most preferably 2, from the viewpoint of mixing.

Since the $H_2$ mixing apparatus of the embodiment of FIGS. 17 and 18 having the above-defined ratio of D/d has a good mixing characteristic, the NOx reduction catalyst shows a high NOx conversion even if the NOx reduction catalytic converter has a monolithic catalyst. Since the required amount of $H_2$ can be reduced by 30–60% at the same NOx conversion rate when the mixer is provided, the amount of fuel required to generate $H_2$ can be decreased so that reduction in fuel economy is minimized when using a monolithic NOx reduction catalyst.

For example, the effect of the mixer was evaluated using a lean burn gasoline engine of 1.6 liters. In the tests, the engine speed was 2000 rpm, the torque was 40 Nm, and the NOx exhaust amount was 0.44 l/min. Without an $H_2$ mixer, the $H_2$ amount required to purify the NOx was 0.66 l min, and the amount of fuel (methanol) to generate the $H_2$ was 0.33 l/min.

When the mixer of FIGS. 17 and 18 with the ratio D/d of 2 was used, the amount of $H_2$ was 0.44 l/min, and the amount of fuel to generate the $H_2$ was 0.22 l/min. Therefore, the amount of 0.11 l/min of fuel could be saved as compared with the above-described case having no mixer.

Figure 20:
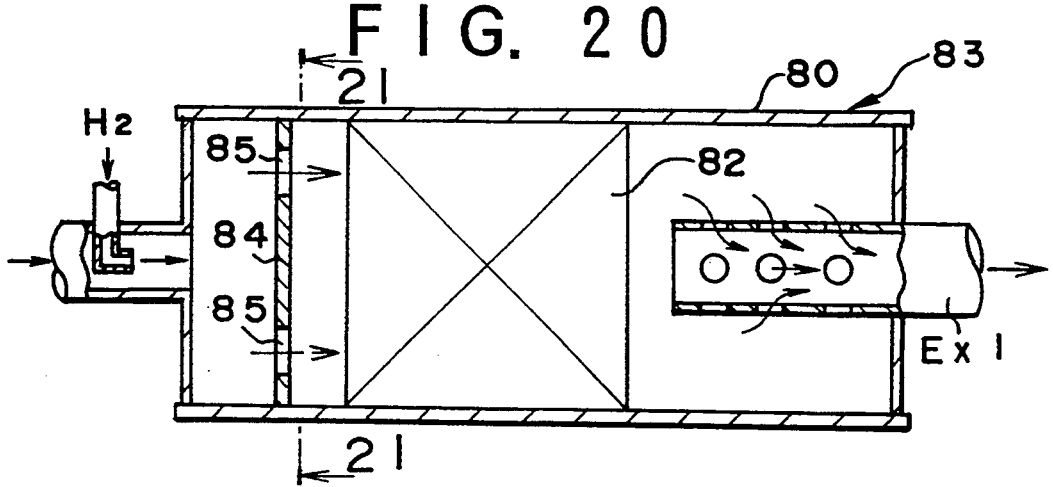
FIG. 20 is an enlarged partial cross-sectional view of another embodiment of an $H_2$ mixer and NOx reduction catalytic converter according to the invention.
Figure 21:
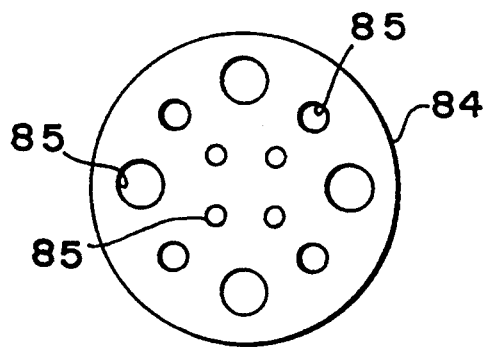
FIG. 21 is a cross-sectional view of the apparatus of the embodiment of FIG. 20 taken along line 21—21.

FIGS. 20 and 21 illustrate another embodiment of an $H_2$ mixer and NOx catalytic converter wherein a lean NOx catalyst 82 is disposed in a muffler 80. When the NOx reduction catalyst is disposed in or near a muffler, where the exhaust gas temperature is low, the reaction rate of $H_2$ with NOx is not high. So, the NOx reduction catalyst should be used at SV values (a ratio of the volume of exhaust gas passing through the catalyst to the volume of the catalyst) of 10,000–60,000, which are smaller than the SV values of 50,000–100,000 of the conventional catalyst disposed near the exhaust manifold. This means that the required volume of the NOx reduction catalyst becomes greater than that of the conventional catalyst disposed near the exhaust manifold.

To make installation of the NOx reduction catalyst easy, the NOx reduction catalyst 82 and the muffler 80 are integrated as a single assembly 83 in the embodiment of FIGS. 20 and 21, wherein the lean NOx catalyst 82 is disposed in the exhaust muffler 80 so that the assembly 83 of the NOx reduction catalyst (Pt-zeolite catalyst) and the exhaust muffler is made compact.

Exhaust gas mixed with $H_2$ flows to the integral assembly 83 of the catalyst and muffler. The exhaust gas mixed with $H_2$ collides with a mixing plate 84 which has many apertures 85 of different sizes. When the exhaust gas mixed with $H_2$ flows through the apertures 85, the exhaust gas and $H_2$ mix well with each other. Then the mixed gas flows to the monolithic catalyst 82. Since no aperture is provided at a center portion of the mixing plate 84, the exhaust gas will not concentrate in a central portion of the monolithic catalyst 82. Since the sizes of the apertures 85 are different from each other, the speeds of portions of gas passing through the apertures are different so that the portions of gas are agitated and the sound is muffled due to interference between portions of the gas.

Since the muffler is usually disposed at a tale pipe of the exhaust conduit and the exhaust gas has been cooled before flowing to the muffler, the temperature of the gas entering the muffler is about 150°–200° C. at the maximum, and about 100°–150° C. in normal operations.

In the cases of the conventional three-way catalyst and the conventional Cu/zeolite-type lean NOx catalyst reducing NOx in the presence of HC, since these catalysts can show activity only in a temperature range above 300°–400° C., they are not allowed to be disposed in a tailpipe muffler. As discussed above, however, when NOx reduction is effected by $H_2$ instead of by HC, NOx purification at low temperatures is possible. However, even in those cases, the temperature is in the range of 150°–300° C. and is slightly higher than the inlet temperature of the exhaust muffler.

It was experimentally investigated from the viewpoint of catalyst activity what kinds of catalysts should be used. From the experiments, it was found that Pd and Rh showed no activity, Cu showed a low activity, and Pt showed a high activity to reduce NOx in cooperation with $H_2$. However, it was also found that Pt should be highly distributed and that, for the high distribution, a carrier having a high specific surface area (greater than 100 m²/g) such as alumina, silica, or zeolite was necessary.

Figure 19:
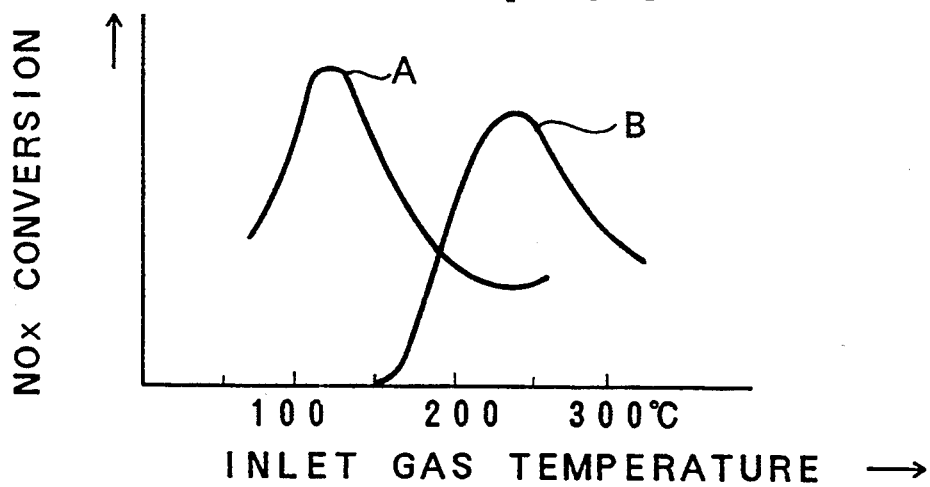
FIG. 19 is a graphical representation of an NOx conversion versus inlet gas temperature characteristic of an apparatus in accordance with a fourth embodiment of the invention.

Further, it was investigated whether the exhaust gas should be pretreated before mixing with $H_2$. The experiment results are shown in FIG. 19. More particularly, when exhaust gas with no pretreatment was mixed with $H_2$ and the mixture was then introduced to the lean NOx catalyst (Pt catalyst), the lean NOx catalyst exhibited its peak activity at about 250° C., as shown by characteristic curve B in FIG. 19. On the other hand, if an oxidizing device such as an afterburner, a reactor, a three-way catalyst, or an oxidation catalyst was installed in the vicinity of the engine exhaust manifold, when exhaust gas was caused to flow through the oxidizing device so that CO and HC were removed from the exhaust gas, the lean NOx catalyst showed its peak activity at 100°–150° C., as shown by characteristic curve A in FIG. 19.

This temperature range of 100°–150° C. coincides with the inlet temperature of the exhaust muffler, which means that it is possible to install the Pt/zeolite-type NOx reduction catalyst 80 within the exhaust muffler 80. Further, it was found that it would be better to remove HC and CO from the exhaust gas before the exhaust gas reached the NOx reduction catalyst. This is because NOx conversion by the lean NOx catalyst would be improved if no soot resulting from incomplete burning of HC were formed on the catalyst.

Further, the sound muffling effect is improved by installing an interference tube EX1 at a location downstream of the monolithic converter 82.

Figure 22:
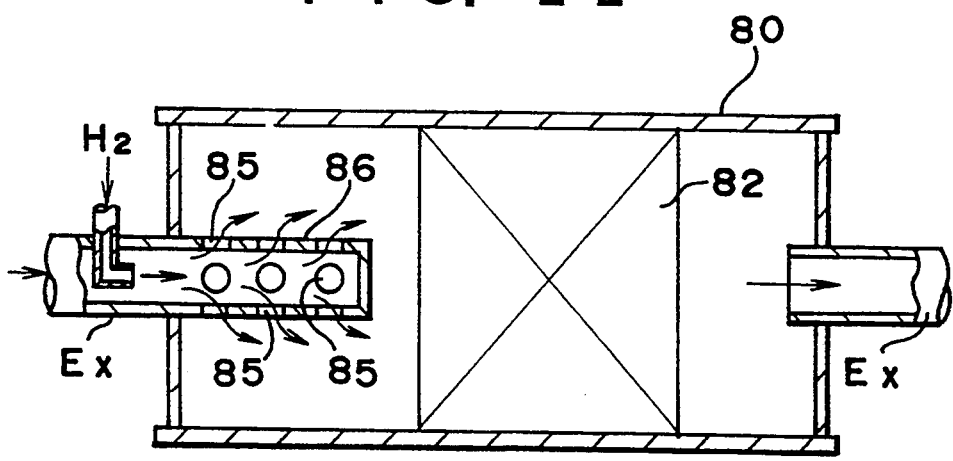
FIG. 22 is a partial cross-sectional view of still another embodiment of an $H_2$ mixer and NOx reduction catalytic converter according to the invention.

An H₂ mixing and NOx reduction catalytic converter apparatus of FIG. 22 is different from the apparatus of FIGS. 20 and 21 only in the structure of the mixer. More particularly, the mixer of FIG. 22 comprises a mixing pipe 86 having a plurality of apertures 85, while the mixer of FIGS. 20 and 21 comprises a mixing plate. H₂ from an H₂ generator is injected into the mixing pipe. The apparatus of FIG. 22 has the same functions and advantages as those of the apparatus of FIGS. 20 and 21.

In the embodiments of FIGS. 20 & 21 and of FIG. 22, since the NOx reduction catalytic converter and the exhaust muffler are integrated into a single assembly 83, the assembly is compact and is easy to be mounted to a vehicle. Further, the apparatus maintains a high NOx conversion characteristic over the entire engine operation range.

Although several embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An $NO_x$ decreasing apparatus for an internal combustion engine comprising:
   an internal combustion engine capable of fuel combustion at lean air-fuel ratios, the engine having an exhaust conduit, an upstream end of which is connected to the engine, and an exhaust muffler installed in the exhaust conduit;
   an $NO_x$ reduction catalyst installed at a downstream, low temperature location in the exhaust conduit, the $NO_x$ reduction catalyst being a zeolite catalyst capable of causing H₂ to selectively react $NO_x$ at temperatures lower than 300° C. under a predetermined engine running condition, wherein the predetermined engine running condition includes an excess oxygen condition, to thereby decompose the $NO_x$ into $N_2$ and $H_2O$;
   an H₂ generator for generating H₂, the H₂ generator including an inner core constructed of a tube inserted in the exhaust conduit, an electro-magnetic valve for injecting one of methanol and hydrocarbons into one end of the tube, and a reforming catalyst housed in the inner core; and
   means for supplying the generated H₂ to an inlet side of the $NO_x$ reduction catalyst, wherein the means for supplying the generated H₂ comprises a mixer for mixing H₂ with exhaust gas from the engine, wherein the mixer is located in the exhaust conduit at an inlet side of the $NO_x$ reduction catalyst.

2. An apparatus according to claim 1, wherein the NOx reduction catalyst is a Pt/zeolite catalyst including zeolite and Pt carried on the zeolite and having a peak NOx conversion through reaction of NOx with H₂ at 100°–150° C.

3. An apparatus according to claim 1, wherein the H₂ generator includes a reforming catalyst for reforming methanol to generate H₂.

4. An apparatus according to claim 3, wherein the reforming catalyst includes at least one kind of catalyst metal selected from the group composed of noble metal including Pt and Pd and transition metal including Cu, Cr, and Ni, said methanol being evaporated by heat from exhaust gas and reformed at the reforming catalyst at about 300° C. to generate H₂.

5. An apparatus according to claim 3, wherein the reforming catalyst comprises a Cu—Ni—Cr/alumina catalyst, said methanol being evaporated by heat from exhaust gas, mixed with air, and reformed at the reforming catalyst at 400°–500° C. to generate H₂.

6. An apparatus according to claim 3, wherein the reforming catalyst includes either one of Cu-Mn and Cu-Zn, said methanol being added with at least one of water vapor, air, and methanol water, and reformed at the reforming catalyst at about 250° C. to generate H₂.

7. An apparatus according to claim 1, wherein the H₂ generator includes a reforming catalyst for reforming hydrocarbons selected from the group consisting of LPG and natural gas to generate H₂.

8. An apparatus according to claim 7, wherein the reforming catalyst includes at least one metal selected from the group composed of Ni, Co, and Rh, said hydrocarbons being added with at least one of water vapor, air, and water, and reformed at the reforming catalyst at 300°–800° to generate H₂.

9. An apparatus according to claim 1, wherein the engine is a hydrogen engine, and the H₂ generator comprises an H₂ fuel tank for the engine.

10. An apparatus according to claim 1, further comprising:
    an NOx sensor for detecting an NOx concentration of exhaust gas to generate an output;
    an intake air sensor for detecting a volume flow of intake air to generate an output; and
    a controller for determining an amount of NOx included in exhaust gas from the engine based on the outputs of the NOx sensor and the intake air sensor, and determining an amount of H₂ required to reduce the determined amount of NOx.

11. An apparatus according to claim 1, further comprising:
    engine operating condition detecting sensors for detecting engine operating conditions and generating output, the engine operating condition detecting sensors including an engine speed sensor and an engine load sensor;
    a controller for determining an amount of NOx included in exhaust gas from the engine based on the outputs from the engine operating condition detecting sensors, and determining an amount of H₂ required to reduce the determined amount of NOx.

12. An apparatus according to claim 1, further comprising an oxidizing device located in the exhaust conduit upstream of the $NO_x$ reduction catalyst for oxidizing hydrocarbons and CO included in exhaust from the engine, and wherein the engine has an exhaust manifold having an outlet and the muffler has an upstream end through which exhaust enters the muffler and a downstream end through which exhaust gas exits the muffler, the H₂ generator being disposed at the exhaust conduit upstream of the muffler, wherein the $NO_x$ reduction catalyst is located downstream of an inlet end of the muffler.

13. An apparatus according to claim 1, further comprising an oxidizing device for oxidizing HC and CO included in exhaust gas from the engine, and wherein the NOx reduction catalyst is a Pt type catalyst which comprises platinum deposited on a carrier selected from the group consisting of zeolite, silica, and alumina.

14. An apparatus according to claim 13, wherein the Pt type catalyst of the NOx reduction catalyst is housed in the muffler to constitute a single assembly of the NOx reduction catalyst and the muffler.

15. An apparatus according to claim 1, wherein the tube includes a coiled portion and wherein the valve injects methanol into the tube, and wherein the reforming catalyst includes Pd.

16. An apparatus according to claim 1, wherein the NOx reduction catalyst comprises a pellet type catalyst.

17. An apparatus according to claim 1, wherein the NOx reduction catalyst comprises a monolithic type catalyst, and wherein the mixer comprises an injection nozzle connected to the $H_2$ generator and having a plurality of radially directed holes for injecting $H_2$ therethrough.

18. An apparatus according to claim 17, has an outside diameter equal to or greater than 20% of an inside diameter of the exhaust conduit, the exhaust conduit being enlarged in diameter at a portion in which the injection nozzle is disposed, the injection nozzle being spaced apart from the NOx reduction catalyst by a distance at least twice the inside diameter of the exhaust conduit and no more than ten times the inside diameter of the exhaust conduit.

19. An apparatus according to claim 1, wherein the NOx reduction catalyst comprises a monolithic type catalyst, and wherein the mixer comprises an injection nozzle having a first diameter, and a cylinder coaxial with and downstream of the injection nozzle, the cylinder having a second diameter greater than the first diameter and having a plurality of injection apertures formed in a wall of the cylinder.

20. An apparatus according to claim 19, wherein a ratio of the second diameter to the first diameter is in the range of 1.7 to 3.

21. An apparatus according to claim 20, wherein the ratio of the second diameter to the first diameter is substantially 2.

22. An apparatus according to claim 14, further comprising a mixing plate disposed in the muffler and upstream of the NOx reduction catalyst, the mixing plate comprising a plate having apertures of different sizes.

23. An apparatus according to claim 14, wherein the means for supplying the generated $H_2$ comprises a mixing pipe disposed in the muffler and connected to the exhaust conduit, the mixing pipe having apertures formed in a wall of the mixing pipe, the $H_2$ generator injecting the generated $H_2$ into the mixing pipe.

24. An apparatus according to claim 13, wherein the oxidizing device is any one of an afterburner, a reactor, a three-way catalyst, and an oxidation catalyst.

25. An apparatus according to claim 1, wherein the $NO_x$ reduction catalyst is located downstream of an inlet end of the exhaust muffler.

26. An apparatus according to claim 25, wherein the $NO_x$ reduction catalyst is located within the muffler.

27. An apparatus according to claim 25, wherein the $NO_x$ reduction catalyst is located downstream of the muffler, near an outlet end of the muffler.

* * * * *

UNITED STATES PATENT AND TRADEMARK OFFICE
CERTIFICATE OF CORRECTION

PATENT NO. : 5,412,946
DATED : May 9, 1995
INVENTOR(S) : Yujiro OSHIMA, et al.

It is certified that error appears in the above-indentified patent and that said Letters Patent is hereby corrected as shown below:

Column 3, line 55, delete the second "is".

Column 5, line 15, change "frin" to --from--.

Column 6, line 4, change "convertor" to --converter--.

Column 6, line 20, change "feforming" to --reforming--.

Column 8, line 18, change "fill" to --fills--.

Column 10, line 13, change "tale" to --tail--.

Column 11, line 39, before "$NO_x$" insert --with--.

Column 13, line 17, after "claim 17" insert --wherein the injection nozzle--.

Signed and Sealed this

Fourteenth Day of May, 1996

Attest:

BRUCE LEHMAN

Attesting Officer

Commissioner of Patents and Trademarks